Dec. 13, 1932.  P. E. KLOPSTEG  1,891,049
DENSITY DEMONSTRATING APPARATUS
Filed Sept. 27, 1929
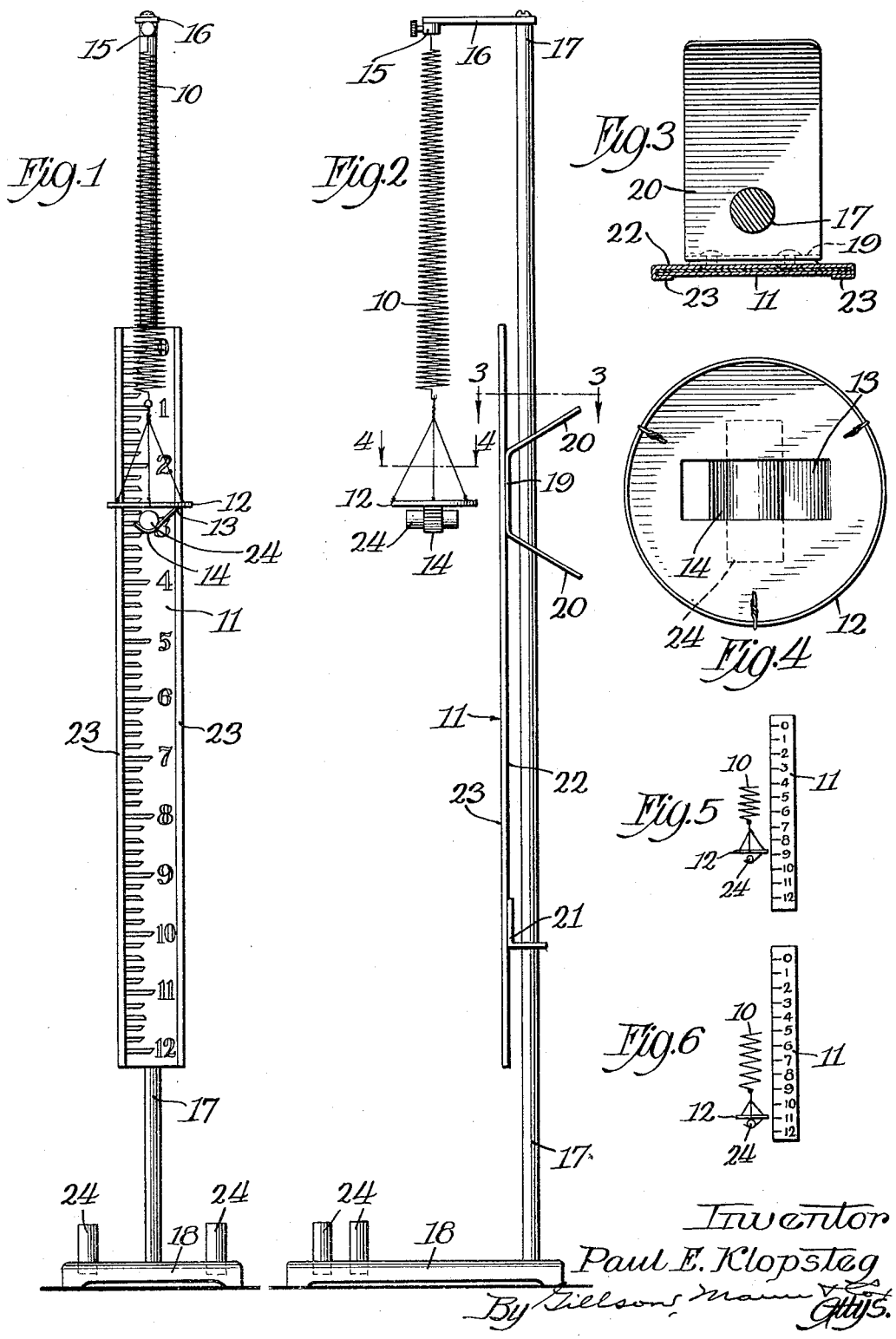
Inventor
Paul E. Klopsteg Patented Dec. 13, 1932

1,891,049

UNITED STATES PATENT OFFICE

PAUL E. KLOPSTEG, OF CHICAGO, ILLINOIS, ASSIGNOR TO CENTRAL SCIENTIFIC COMPANY, A CORPORATION OF ILLINOIS

DENSITY DEMONSTRATING APPARATUS

Application filed September 27, 1929. Serial No. 395,728.

This invention relates to apparatus for determining density, and, among other objects aims to provide a simple apparatus for visually demonstrating the concept of mass as an entity or property of matter.

The nature of the invention may be readily understood by reference to one construction embodying the invention and illustrated in the accompanying drawing, in which:

Fig. 1 is a front elevation of the apparatus;

Fig. 2 is a side elevation thereof;

Fig. 3 is a plan section taken approximately on the line 3—3 of Fig. 2;

Fig. 4 is a plan view of the index member and the associated device for supporting a specimen;

Figs. 5 and 6 are views, more or less diagrammatic in character, illustrating a demonstration of the density of copper and lead, respectively.

The illustrative apparatus is in the form of a jolly balance and is characterized by a resilient element in the form of a spiral spring 10 and an associated scale 11 whose calibration is partly determined by the properties of the spring. In the present case the spring is designed to elongate equal distances for equal increments of load within its limit of elasticity; and for the sake of simplicity the spring is made to elongate approximately one centimeter per gram of load. To this end, the spring is frusto-conical in shape (see "Period of a Loaded Conical Jolly Balance Spring" by R. B. Abbott, Journal of the Optical Society of America and Review of Scientific Instruments, 17, p. 318, 1928), and is made from a non-rusting alloy and heat treated.

Appropriately connected to the lower end of the spring is an index member represented by a pan 12 with which is associated a specimen holder 13 in the form of a metal strip 14 curved adjacent its free end to provide a pocket and integral at its other end with the index 12. The upper end of the spring is removably secured at 15 to an arm 16 which projects from the upper end of an upright or standard represented by a rod 17 of circular cross section. The base 18 in which the standard is seated is of sufficient weight to insure the stability of the apparatus.

The scale 11 is advantageously carried by the standard 17 and in this instance is made vertically adjustable thereon so that the zero mark on the scale may be brought into register with the zero position of the index 12. Such adjustability is provided by the spring clamp 19 through the arms 20 of which the standard 17 passes, the resilient separation of the arms serving to exert a gripping or clamping action on the standard. The lower end of the scale is guided on the standard by an angle bracket 21 through which the standard passes.

In the present case the scale is removably held in a flanged channel 22 to the back of which the clamp 19 and bracket 21 are secured. The flanges 23 frictionally grip the scale with sufficient firmness to hold it in position. Nevertheless the scale may be removed to be replaced by another having a different graduation.

For effecting a simple demonstration of the difference in density of various materials, specimens 24 of equal volume (and preferably of geometrical congruity) are employed; and the scale is so graduated that when the spring is elongated by a given specimen its index will register with the scale reading representing the density of the material of the specimen. For example, for a lead specimen the index registers with 11.4 on the scale, for copper 8.9, and for aluminum 2.7, etc. It will be apparent that this direct reading of densities will be obtained when the unit graduations are equally spaced because of the fact that the spiral spring 10 is designed to elongate equal distances for equal increments of load.

Figs. 5 and 6 show, respectively, the position assumed by the index for copper and lead specimens, respectively; and Figs. 1 and 2 show the position assumed by an aluminum specimen. In the present case the specimens are cylindrical in shape and are conveniently carried in recesses in the base of the apparatus.

It will be understood that a single scale will give direct readings of specific gravity for all specimens of the volume to which the scale is calibrated. If specimens of some other given volume are employed, it is, of course, necessary to substitute another scale calibrated to the particular volume in order to secure direct reading from the scale.

The apparatus may also advantageously be employed to demonstrate reciprocal density, for the purpose of further emphasizing the concept of mass as a distinct property of matter not wholly dependent upon volume. For example, a number of specimen materials of equal mass, and preferably of equal and uniform cross section, are employed.

The scale reading on the apparatus will show them to be of equal mass and their variation in length will demonstrate the inverse relation of the density to the volume of the various materials.

Obviously the invention is not limited to the precise details of the illustrative construction since these may be variously modified. Moreover, it is not indispensable that all features of the invention be used conjointly since various features may be advantageously employed in different combinations and subcombinations.

I claim as my invention:

1. In a jolly balance, a standard, a spring suspended therefrom designed to elongate equal distances for equal increments of load within its limit of elasticity, a specimen holder secured to the lower end of the spring, a graduated scale secured to the standard in juxtaposition to the spring and holder, said scale being so calibrated that when a solid specimen of a given volume is placed in the holder, the holder will indicate on the scale the specific gravity of that specimen.

2. In a jolly balance, a standard, a spring suspended therefrom designed to elongate equal distances for equal increments of load within its limit of elasticity, a specimen holder secured to the lower end of the spring, an index associated with the specimen holder, a vertical scale adjustably secured to the standard, said scale being equally graduated and so calibrated that when a solid specimen of a given volume is placed on the holder, the index will point to a graduation on the scale corresponding to the specific gravity of the specimen.

3. In a jolly balance, a standard, a spring suspended therefrom designed to elongate equal distances for equal increments of load within its limit of elasticity, a specimen holder secured to the lower end of the spring and adapted to support any one of a plurality of solid specimens of different composition but of equal volume, a graduated scale secured to the standard, said scale being so calibrated that when a selected one of the solid specimens is placed in the holder, the holder will indicate directly on the scale the specific gravity of that specimen.

4. In a jolly balance, a standard, a spring suspended therefrom designed to elongate equal distances for equal increments of load within its limit of elasticity, a specimen holder secured to the lower end of the spring and adapted to support any one of a plurality of specimens of different substances having geometrical congruity each with the other, an index associated with the specimen holder, a vertical scale removably secured to the standard, said scale being equally graduated and so calibrated that when a selected one of the specimens is placed in the holder, the index will point to a graduation on the scale corresponding to the specific gravity of that specimen.

In testimony whereof, I affix my signature.

PAUL E. KLOPSTEG.